(12) United States Patent
Li et al.

(10) Patent No.: US 10,482,136 B2
(45) Date of Patent: Nov. 19, 2019

(54) METHOD AND APPARATUS FOR EXTRACTING TOPIC SENTENCES OF WEBPAGES

(71) Applicant: GUANGZHOU SHENMA MOBILE INFORMATION TECHNOLOGY CO., LTD., Guangzhou (CN)

(72) Inventors: Chenyao Li, Guangzhou (CN); Honglei Zeng, Guangzhou (CN)

(73) Assignee: GUANGZHOU SHENMA MOBILE INFORMATION TECHNOLOGY CO., LTD., Guangzhou (CN)

(*) Notice: Subject to any disclaimer, the term of this patent is extended or adjusted under 35 U.S.C. 154(b) by 397 days.

(21) Appl. No.: 15/357,661

(22) Filed: Nov. 21, 2016

(65) Prior Publication Data

US 2017/0147691 A1 May 25, 2017

(30) Foreign Application Priority Data

Nov. 20, 2015 (CN) .......................... 2015 1 0818653

(51) Int. Cl.
  *G06F 17/30* (2006.01)
  *G06F 16/951* (2019.01)
  *G06F 16/36* (2019.01)

(52) U.S. Cl.
  CPC ............ *G06F 16/951* (2019.01); *G06F 16/36* (2019.01)

(58) Field of Classification Search
  CPC .. G06F 16/951; G06F 16/953; G06F 16/9532; G06F 16/9538; G06F 16/36
  USPC .......... 707/E17.108, 722, 736, 758, 531, 532
  See application file for complete search history.

(56) References Cited

U.S. PATENT DOCUMENTS

| | | | |
|---|---|---|---|
| 9,015,153 B1* | 4/2015 | Zhang | G06F 17/28 707/723 |
| 9,336,192 B1* | 5/2016 | Barba | G06F 17/277 |
| 2002/0052901 A1 | 5/2002 | Guo | |
| 2007/0150473 A1* | 6/2007 | Li | G06F 16/951 |
| 2009/0319342 A1* | 12/2009 | Shilman | G06Q 10/06395 705/7.41 |

(Continued)

FOREIGN PATENT DOCUMENTS

| | | |
|---|---|---|
| CN | 101398814 A | 4/2009 |
| CN | 101620596 A | 1/2010 |
| CN | 104298709 A | 1/2015 |

*Primary Examiner* — Shiow-Jy Fan
(74) *Attorney, Agent, or Firm* — Anova Law Group, PLLC (57) ABSTRACT

In various embodiments, a method and an apparatus for extracting topic sentences of webpages are provided. The method comprises: obtaining candidate webpages, and a pre-built machine learning model, each candidate webpage contains multiple preselected candidate topic sentences, and each candidate topic sentence includes several word segments; determining word feature values that indicate importance levels of the word segments in each candidate webpage respectively, and inputting the word feature values to the machine learning model to obtain an importance value for each word segment; for each candidate webpage, determining a partial order value for each candidate topic sentence according to the importance values of the word segments included in the candidate topic sentence; and for each candidate webpage, selecting one of the plurality of candidate topic sentences that is associated with a partial order value larger than a preset threshold value as a target topic sentence of the candidate webpage.

20 Claims, 3 Drawing Sheets

(56) References Cited

U.S. PATENT DOCUMENTS

| | | | |
|---|---|---|---|
| 2009/0327264 A1* | 12/2009 | Yu | G06F 16/951 |
| 2011/0029517 A1* | 2/2011 | Ji | G06F 16/951 |
| | | | 707/734 |
| 2011/0040769 A1* | 2/2011 | Tseng | G06F 16/951 |
| | | | 707/750 |
| 2011/0087673 A1* | 4/2011 | Chen | G06F 16/951 |
| | | | 707/748 |
| 2011/0093459 A1* | 4/2011 | Dong | G06F 16/9535 |
| | | | 707/725 |
| 2012/0209795 A1* | 8/2012 | Glickman | G06Q 30/0201 |
| | | | 706/12 |
| 2013/0132401 A1* | 5/2013 | Moon | G06F 16/904 |
| | | | 707/748 |

* cited by examiner

METHOD AND APPARATUS FOR EXTRACTING TOPIC SENTENCES OF WEBPAGES

CROSS-REFERENCES TO RELATED APPLICATIONS

This application claims the priority of Chinese Patent Application No. 201510818653.5 filed on Nov. 20, 2015, the entire content of which is incorporated herein by reference.

FIELD OF THE DISCLOSURE

The present disclosure generally relates to the field of Internet technology and, more particularly, relates to a method for extracting topic sentences of webpages, and an apparatus for extracting topic sentences of webpages.

BACKGROUND

With the rapid development of Internet technology, the Internet has become an important channel for people to obtain information. Specifically, a user can enter a query term in a search engine, and the search engine can retrieve a number of webpages in response to the query term for the user to selectively view these webpages. It should be noted that, in order to facilitate the user's viewing, the retrieved webpages can be ranked by the search engine in accordance with the relevance of a webpage to the query term.

The relevance can indicate a similarity between a topic sentence of one retrieved webpage and the query term. For example, for a query term of "symptoms of hepatitis B," a topic sentence of a retrieved webpage 1 is "what are the symptoms of hepatitis B," and a topic sentence of a retrieved webpage 2 is "hepatitis B virus transmissions." Since the topic sentence of the retrieve page 1 is more similar to the query term, the retrieve page 1 is more relevant to the query term and thereby being placed in a front position of the search results. Therefore, the webpage topic sentence can directly affect the ranking order of the retrieve webpages, thereby affecting the user satisfaction with the search results.

Currently, extraction of topic sentences of webpages is based on some manually summarized extraction rules using arbitrary webpages, and these extraction rules are then used to determine a topic sentence of a specific webpage. However, the accuracy of the topic sentences extracted from the webpages by using such extraction methods is relatively low.

The disclosed method and apparatus are directed to solve one or more problems set forth above and other problems.

BRIEF SUMMARY OF THE DISCLOSURE

In accordance with some embodiments of the present disclosure, a method and an apparatus for extracting topic sentences of webpages are provided.

An aspect of the present disclosure provides a method for extracting topic sentences of webpages, comprising: obtaining a plurality of candidate webpages, and a pre-built machine learning model, wherein each candidate webpage of the plurality of candidate webpages contains a plurality of preselected candidate topic sentences, and each candidate topic sentence includes a plurality of word segments; determining a word feature value for each word segment, wherein the word feature value indicates an importance level of the word segment in each candidate webpage; inputting the word feature values corresponding to the plurality of word segments to the machine learning model to obtain an importance value for each word segment; for each candidate webpage, determining a partial order value for each candidate topic sentence according to the importance values of the word segments included in the candidate topic sentence; and for each candidate webpage, selecting one of the plurality of candidate topic sentences that is associated with a partial order value larger than a preset threshold value as a target topic sentence of the candidate webpage.

In some embodiments, the method further comprises a process for pre-building the machine learning model, including: obtaining page titles of a plurality of webpage samples, wherein each webpage sample corresponds to one or more query terms for retrieving the webpage sample, each query term is associated with a weighted value for indicating a correlation degree between the query term and the retrieved webpage sample; calculating a label value for each word segment included in each page title; determining a word feature value for each word segment included in each page title, wherein the word feature value indicates an importance degree of the word segment in the corresponding webpage sample; and using a preset machine training algorithm to train the label values and the word feature values of the word segments in each page title to obtain the machine learning model.

In some embodiments, the label value for each word segment included in each page title is calculated by using a formula of $$\text{label}(term_j) = \sum_{m=0}^{k}\left(v_m * w_m(term_j) \bigg/ \left(\sum_{n=0}^{s} w_m(term_n)\right)\right),$$

wherein $term_j$ indicates a j-th word segment included in the page title, $\text{label}(term_j)$ is a label value of the word segment $term_j$, m is a query term, k is a total number of query terms, $v_m$ is a weighted value of the query term m, $w_m(term_j)$ is a weighted value of the word segment $term_j$ the query term m, n is a word segment in the page title, and s is a total number of word segments in the page title.

In some embodiments, the preset machine training algorithm is a GBRank training algorithm; a partial order comparison method in the GBRank training algorithm is a pairwise partial order comparison; and a loss function in the GBRank training algorithm is a cross entropy.

In some embodiments, determining a partial order value for each candidate topic sentence comprises: for each candidate topic sentence, calculating a weighted summation of the plurality of importance values of the word segments included in the candidate topic sentence as the partial order value of the candidate topic sentence.

In some embodiments, the method further comprises establishing a correspondence relationship between the plurality of target topic sentences and the plurality of candidate webpages; and storing the correspondence relationship in a preset database.

In some embodiments, the method further comprises: in response to a searching query of a search engine, determining a plurality of retrieved webpages by the search engine, wherein the plurality of retrieved webpages are included in the plurality of the candidate webpages; retrieving the target topic sentence of each retrieved webpage from the preset database, and matching the target topic sentence with the searching query to obtain a matching value for each retrieved webpage; and ranking the plurality of retrieved webpages based on the corresponding matching values.

In some embodiments, determining the word feature value for each word segment comprises: calculating a term frequency, an inverse document frequency, a continuous hit rate, and a proximity of each word segment.

Another aspect of the present disclosure provides apparatus for extracting topic sentences of webpages, comprising one or more processors, memory, and one or more program modules stored in the memory and to be executed by the one or more processors, the one or more program modules comprising: a webpage and model obtaining module configured for obtaining a plurality of candidate webpage, and pre-building a machine learning model, wherein each candidate webpage contains a plurality of preselected candidate topic sentences, and each candidate topic sentence includes a plurality of word segments; a word segment importance value determining module configured for determining a word feature value for each word segment, and inputting the word feature values corresponding to the plurality of word segments to the machine learning model to obtain an importance value for each word segment, wherein the word feature value indicates an importance level of the word segment in each candidate webpage; a topic sentence partial order value determining module configured for determining, for each candidate webpage, a partial order value for each candidate topic sentence according to the importance values of the word segments of the candidate topic sentence; and a topic sentence determining module configured for selecting, for each candidate webpage, one of the plurality of candidate topic sentences that is associated with a partial order value larger than a preset threshold value as a target topic sentence of the candidate webpage.

Another aspect of the present disclosure provides a non-transitory computer readable memory comprising a computer readable program stored thereon, wherein, when being executed, the computer readable program causes a computer to implement a method for extracting topic sentences of webpages, the method comprising: obtaining a plurality of candidate webpage, and a pre-built machine learning model, wherein each candidate webpage contains a plurality of preselected candidate topic sentences, and each candidate topic sentence includes a plurality of word segments; determining a word feature value for each word segment, wherein the word feature value indicates an importance level of the word segment in each candidate webpage, the word feature value includes a term frequency, an inverse document frequency, a continuous hit rate, and a proximity of the word segment; inputting the word feature values corresponding to the plurality of word segments to the machine learning model to obtain an importance value for each word segment; for each candidate webpage, determining a partial order value for each candidate topic sentence according to the importance values of the word segments included in the candidate topic sentence; and for each candidate webpage, selecting one of the plurality of candidate topic sentences that is associated with a partial order value larger than a preset threshold value as a target topic sentence of the candidate webpage.

Other aspects of the present disclosure can be understood by those skilled in the art in light of the description, the claims, and the drawings of the present disclosure.

BRIEF DESCRIPTION OF THE DRAWINGS

Various objects, features, and advantages of the present disclosure can be more fully appreciated with reference to the following detailed description of the present disclosure when considered in connection with the following drawings, in which like reference numerals may identify like elements. It should be noted that the following drawings are merely examples for illustrative purposes according to various disclosed embodiments and are not intended to limit the scope of the present disclosure.

DETAILED DESCRIPTION

Reference will now be made in detail to exemplary embodiments of the invention, which are illustrated in the accompanying drawings. Hereinafter, embodiments consistent with the disclosure will be described with reference to drawings. Wherever possible, the same reference numbers will be used throughout the drawings to refer to the same or like parts. It is apparent that the described embodiments are some but not all of the embodiments of the present invention. Based on the disclosed embodiments, persons of ordinary skill in the art may derive other embodiments consistent with the present disclosure, all of which are within the scope of the present invention.

In accordance with various embodiments, the present disclosure provides a method and an apparatus for extracting topic sentences of webpages.

Figure 1:
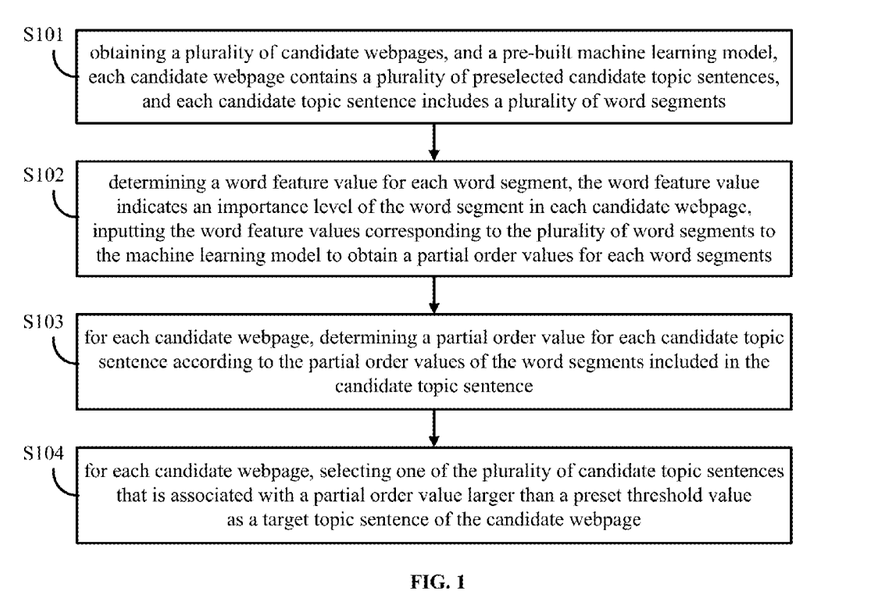
FIG. 1 illustrates a flowchart of an exemplary process for extracting topic sentences from webpages in accordance with some embodiments of the present disclosure.

Referring to FIG. 1, a flowchart of an exemplary process for extracting topic sentences from webpages is shown in accordance with some embodiments of the present disclosure. As illustrated, the disclosed topic sentence extraction method can include the following steps S101-S104.

At step S101, at least one candidate webpage can be obtained, and a pre-built machine learning model can be provided. The at least one candidate webpage can contain multiple preselected candidate topic sentences, and each candidate topic sentence can include multiple word segments.

Before the step S101, a machine learning model, such as a supervised machine learning model, can be pre-built. The machine learning model is a model constructed using a preset training method. The preset training method can use multiple webpage files that are retrieved in response to a query term as the training samples.

Specifically, a user can enter a query term in a search engine. The search engine can retrieve multiple webpages associated with the query term. If the user figures out that one or more retrieved webpages are closely relevant to the query term, the user can access the one or more retrieved webpages. By tracking user's webpage accessing history, total accessing numbers of each webpage can be obtained and further be converted into a weighted value of the webpage.

Further, multiple query terms corresponding to each webpage can be collected. Total accessing numbers of each webpage (i.e., total number of accesses to each webpage) associated with a specific term can be obtained and further be converted into a weighted value of the webpage associated with the specific term.

That is, the training samples used by the preset training method are multiple webpages respectively associated with a mapping of weighted values and query terms. Each weighted value can be obtained based on tracking user's accessing history of the corresponding retrieved webpage in response to a certain query term. Thus, the weighted value can indicate a degree of correlation between the corresponding webpage and the certain query term. Also, the weighted value can reflect a user satisfaction with the corresponding webpage in respect to the certain query term.

It should be noted that, the pre-built machine learning model can use a large-scale users accessing samples in order to mark the keywords in the webpages, so that the machine learning model can learn the rules of the degrees of importance of the words and phrases from the large-scale users accessing sample data, and can express the degrees of importance of the words and phrases in a form of models.

The one or more candidate webpages can be captured from a network such as the Internet by using a web crawler tool. The one or more candidate webpages can be at least one candidate webpage, and can also be multiple candidate webpages. A target topic sentence can be determined for each of the webpages by using some embodiments of the disclosed method.

It should be noted that, each candidate webpage can contain a large number of statements. Firstly, a small number of statements can be selected as candidate topic sentences. And then in the subsequent steps, a target topic sentence can be determined from the small number of candidate topic sentences. As such, the efficiency of determining the topic sentences of webpages can be improved.

The selected candidate topic sentences can be the sentences that are most likely to contain the target topic sentence. For example, some regions or domains of a webpage, including the title of the page, the title of the article, the anchor, the breadcrumb, and the meta of the website, etc., are most likely to contain the keywords of the entire content of the webpage. Therefore, the candidate topic sentences can be extracted from these domains. Specifically, the page title may be a punctuated page title. It should be noted that, the above discussed domains are merely for examples. The candidate topic sentences can be selected from any suitable domains.

After obtaining the candidate topic sentences, a word segmentation tool can be used to separate the candidate topic sentences to obtain multiple word segments. The multiple word segments can be also referred as candidate keywords. For example, a candidate topic sentence is "hepatitis B causes fever", and the word segments can be "hepatitis B," "causes" and "fever."

At step S102, a word feature value for each word segment can be determined. The word feature value can indicate a degree of importance of the word segment in the candidate webpage. Multiple word feature values corresponding to the multiple word segments can be inputted to the machine learning model to obtain the importance values of the word segments.

In some embodiments, a preset feature value determination algorithm can be used to determine the word feature value for each word segment. The word feature value can indicate a degree of importance of the corresponding word segment in the candidate webpage.

Specifically, multiple feature value determination algorithms can be preset in advance for determining different kinds of word feature values, respectively. That is, in order to calculate a certain type of word feature of the word segments, a corresponding feature value determination algorithm can be preset for the purpose.

For example, different types of word features can include but be not limited to: term frequency (TF), inverse document frequency (IDF), continuous hit rate, proximity, length of page title, page type, etc. As such, the word feature of a word segment can be any suitable combination thereof.

In some embodiments, any suitable algorithm can be used as a feature value determination algorithm for a specific type of word feature.

For example, an exemplary algorithm for determining the word frequency can include the following steps: a total number of word segments in a webpage can be determined; a number of occurrences of a certain word segment in the webpage can be determined; a word frequency of the word segment in the webpage can be obtained by dividing the number of occurrences of the word segment by the total number of words segments.

For another example, an exemplary algorithm of determining the inverse document frequency can include the following steps: a total number of paragraphs of the webpage can be determined; a number of paragraphs that contain a certain word segment can be determined; an inverse document frequency of the word segment can be equal to a logarithm of the ratio of the total number of paragraphs of the webpage and the number of paragraphs that contain the word segment.

For another example, an exemplary algorithm of determining the continuous hit rate can include the following steps: a word window starting with a certain word segment and having a preset length can be defined; and a hitting frequency of the word window in the webpage can be determined as the continuous hit rate.

For another examples, an exemplary algorithm of determining the proximity can be calculating a degree of grammatical correlation between a certain word segment and other word segments; an exemplary algorithm of determining the length of page title can be counting a number of words in the page title; and an exemplary algorithm of determining page type can be mapping the content of the webpage to a preset category.

It should be noted that, the above described types of word features are merely examples which do not limit the scope of the disclosed subject matter. Any other suitable types of word features can be included for indicating a degree of importance of the word segment in the candidate webpage.

After determining the feature values of word segments, the feature values of each word segment can be inputted to the machine learning model to obtain importance values of the word segments respectively.

Specifically, an input of the machine learning model can be the feature values of word segments in the candidate topic sentences, and an output can be the importance values of the word segments. In some embodiments, for each word segment in the candidate topic sentences, the feature value of the word segment can be inputted into the machine learning model. The machine learning model can calculate an importance value of the word segment according to the feature value of the word segment. As such, importance value of each word segment in the candidate topic sentences can be obtained.

At step S103, a partial order value of each candidate topic sentence can be determined according to the importance values of the word segments included in each candidate topic sentence.

Generally, each candidate topic sentence includes multiple word segments, and each word segment has a corresponding importance value. By using the importance values of the word segments, a partial order value of the candidate topic sentence can be obtained. For example, the partial order value of the candidate topic sentence can be a direct summation of the importance values of every word segments of the candidate topic sentence. For another example, the partial order value of the candidate topic sentence can be a weighted summation of importance values of every word segments of the candidate topic sentence, which is described in details below.

It should be noted that, each candidate webpage may contain multiple candidate topic sentences. For each candidate topic sentence, a corresponding partial order value can be determined.

At step S104, a candidate topic sentence associated with a partial order value that is larger than a preset threshold value can be determined as a target topic sentence of the webpage.

In some embodiments, a threshold partial order value can be preset. And if one candidate topic sentence is associated with a partial order value that is larger than threshold partial order value, the one candidate topic sentence can be determined as a target topic sentence of the webpage.

Accordingly, in the disclosed method for extracting topic sentences from webpages, at least one candidate webpage can firstly be obtained, each candidate webpage can contain multiple candidate topic sentences, and each candidate topic sentence can include multiple word segments. Then, a word feature value can be determined for each word segment. Multiple word feature values corresponding to the multiple word segments can be inputted to a preset machine learning model to obtain the importance values of the word segments. Next, a partial order value of each candidate topic sentence can be determined according to the importance values of the word segments included in each candidate topic sentence. Finally, a candidate topic sentence associated with a partial order value that is larger than a preset threshold value can be determined as a target topic sentence of the webpage.

It should be noted that, the disclosed method can use a machine learning model to obtain partial order values of candidate topic sentences. Since the webpage samples used in the training process of the machine learning model can reflect the degrees of correlation with the query term, the obtained machine learning model can be more accurate. Thus, the accuracy of the target topic sentence selection can be improved.

Specifically, the topic sentence of a certain webpage is generally determined based on manually summarized extraction rules using arbitrary webpages. Therefore, the accuracy of the target topic sentence selection is relatively low. It should be noted that, the manually artificially summarized extraction rules are generated based on arbitrary webpages, so extraction rules are merely a accumulation of simple conditions, such as a specific word is important or unimportant under a certain condition. The simple conditions are difficult to accurately represent the degree of importance of a word in a webpage.

However, in some embodiments of the disclosed method, the constructed machine learning model can use retrieved webpages in response to a query term as the webpage samples, so that the webpage samples can reflect the degrees of correlation with the query term. The degrees of correlation can be specified by using the accessing behaviors of the retrieved webpages. Therefore, the machine learning model constructed in the disclosed method can generate more accurate extraction rules than the existing extraction rules, and the target topic sentence of the webpage extracted by using the disclosed method can be more accurate.

In some implementations, in order to further improve the accuracy of determining the target topic sentence of a candidate webpage, an external link of the candidate webpage can be used to filter the candidate topic sentences. Specifically, before the step S104, an external links of the candidate webpage can be obtained. The external link can be a piece of text content.

A similarity degree between the external link and each candidate topic sentence can be determined. According to the similarity degree, a penalty factor can be generated to the candidate topic sentence. The penalty factor can be larger than 0, and less than or equal to 1. A higher similarity degree can correspond to a larger penalty factor. The partial order value of the candidate topic sentence can be calculated based on the penalty factor.

Then, step S104 can be executed with the partial order values that has been processed based on the corresponding penalty factors. That is, if a processed partial order value based on the penalty factor is larger than the preset threshold value, the corresponding candidate topic sentence can be determined as the target topic sentence.

For example, there are two candidate topic sentences of a candidate webpage, namely, candidate topic sentence one: "Hepatitis B causes fever," and candidate topic sentence two: "What is Hepatitis B and how does the fever cool?" The partial order values of the two candidate topic sentences are 0.5 and 0.7 respectively.

The external link to the candidate webpage is "Hepatitis B causes fever." It is obvious that the candidate topic sentence one is more similar to the external link, so that the penalty factor of the candidate topic sentence one is 1, and the penalty factor of the candidate topic sentence two is 0.5. The partial order value of the candidate topic sentence one can be calculated as 0.5×1=0.5, and the partial order value of the candidate topic sentence two can be calculated as 0.7×0.5=0.35.

Figure 2:
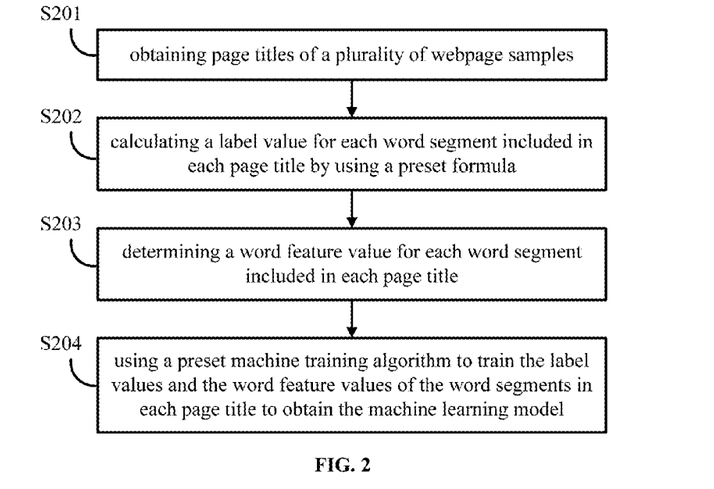
FIG. 2 illustrates a flowchart of an exemplary method for constructing a machine learning model in accordance with some embodiments of the present disclosure.

Referring to FIG. 2, a flowchart of an exemplary method for constructing a machine learning model is shown in accordance with some embodiments of the present disclosure. As illustrated, the method for constructing a machine learning model can include steps S201 to S204 described in details below.

At step S201, the page titles of the multiple webpage samples can be obtained. Each webpage sample can correspond to one or more query terms for retrieving the webpage sample. Each query term can be associated with a weighted value. The weighted value can be used to indicate a correlation degree between the query term and the retrieved webpage sample.

It should be noted that, the construction of the machine learning model requires training samples, and the training samples can be the webpage samples obtained in step S201. The webpage samples can be captured from a network such as the Internet by using a web crawler tool.

It also should be noted that, in order to improve the user satisfaction of the determined target topic sentence, in construction of the machine learning model, each webpage sample is associated with a weighted value. The weighted value can reflect a correlation degree between the query term and the retrieved webpage sample, and the correlation degree can reflect user's satisfaction.

Specifically, a query term can be entered in a search engine, and multiple webpage samples can be retrieved in response to the query term. Page titles of the webpage samples can be displayed in the search engine. If a user is satisfied with the content of one or more of the webpage samples, the user may vote on the one or more webpage samples by clicking on page titles of the one or more webpage samples. As a result, the clicking numbers of clicks on the webpage samples can be monitored to determine the weighted value of the webpage samples. The weighted value may be obtained by dividing the number of clicks by a certain preset value.

As described above, in some embodiments, the weighted value of the webpage samples can be determined in respect to the query terms. In some other embodiments, the weighted value of the webpage samples can be determined in respect to the webpage sample, as described in details below.

Specifically, a query term can retrieve multiple webpage samples. Assuming that the page title of multiple webpage samples in response to a query term $q_i$ are $\{t_{i1}, t_{i2}, \ldots, t_{ik}\}$. The weighted values of the multiple webpage samples are $\{v_{i1}, v_{i2}, \ldots, v_{ik}\}$. The date correlation of the query term can be expressed as $\{(q_i, ((t_{i1}, v_{i1}), (t_{i2}, v_{i2}), \ldots, (t_{ik}, v_{ik})))\}$.

Conversely, a webpage sample can also correspond to multiple query terms. If a user inputs a query term, and then clicks on one webpage sample, this may indicate that the webpage sample may be closely related to the query term. Therefore, a topic sentence of the webpage sample can be described by using the words in the query term.

After inverting the data correlation of the query term, the date correlation of the webpage sample can be expressed as $\{(t_m, ((q_{m1}, v_{m1}), (q_{m2}, v_{m2}), \ldots, (q_{mk}v_{mk})))\}$, where $t_m$ is an arbitrary page title from $\{t_{i1}, t_{i2}, \ldots, t_{ik}\}$, $\{q_{m1}, q_{m2}, \ldots, q_{mk}\}$ are multiple query terms, and $\{v_{m1}, v_{m2}, \ldots, v_{mk}\}$ are the weighted valued for the web page sample.

From the obtained data correlation of the webpage samples $\{(t_m, ((q_{m1}, v_{m1}), (q_{m2}, v_{m2}), \ldots, (q_{mk}, v_{mk})))\}$, it can be seen that any one webpage sample $t_m$ corresponds to multiple query terms $\{q_{m1}, q_{m2}, \ldots, q_{mk}\}$ respectively. In respect to those query terms, the weighted value of the webpage sample are $\{v_{m1}, v_{m2}, \ldots, v_{mk}\}$ respectively. At step S202, for each page title, a label value of each word segment that is included in the page title can be calculated by using the formula of $$\text{label}(term_j) = \sum_{m=0}^{k}\left(v_m * w_m(term_j) \Big/ \left(\sum_{n=0}^{s} w_m(term_n)\right)\right),$$

where $term_j$ indicates a j-th word segment included in the page title, $\text{label}(term_j)$ is a label value of the word segment $term_j$, m is a query term, k is a total number of query terms, $v_m$ is a weighted value of the query term m, $w_m(term_j)$ is a weighted value of the word segment $term_j$ for the query term m, n is a word segment in the page title, and s is a total number of word segments in the page title.

Specifically, when there are multiple webpage samples, multiple corresponding page titles can be obtained. Each page title can contain multiple word segments. For each page title, a label value of each word segment contained in the page title can be calculated according to the above label value formula. It should be noted that, the term $w_m(term_j)$ in the label value formula can be calculated by a word segment tool.

For example, a page title of a webpage sample is "does Hepatitis B cause fever?" In the monitored clicking date, the page sample was clicked in response to query term one "Hepatitis B causes fever," and query term two "symptoms of Hepatitis B." According to the clicking data, the weighted values $v_m$ of the two query terms can be calculated as 1.5 and 0.5 respectively.

Using the word segmentation tool, the weighted values of the word segments of query term one "Hepatitis B causes fever" can be calculated. The weighted value of the word segment "Hepatitis B" is 97, the weighted value of the word segment "cause" is 73, and the weighted value of the word segment "fever" is 85.

Using the word segmentation tool, the weighted values of the word segments of query term two "symptoms of Hepatitis B" can be calculated. The weighted value of the word segment "Hepatitis B" is 105, the weighted value of the word segment "of" is 5, and the weighted value of the word segment "symptom" is 85.

Based on the above data, the label values of the word segments included in the webpage sample "does Hepatitis B cause fever?" can be calculated. Specifically, the webpage sample contains the four word segments "hepatitis B," "does," "cause" and "fever."

The label value of the word segment "Hepatitis B" is: 1.5*97/(97+73+85)+0.5*105/(105+5+85)=0.839; the label value of the word segment "does" is: 1.5*0/(97+73+85)+0.5*0/(105+5+85)=0; the label value of the word segment "cause" is: 1.5*73/(97+73+85)+0.5*0/(105+5+85)=0.42; and the label value of the word segment "fever" is: 1.5*85/(97+73+85)+0.5*0/(105+5+85)=0.5.

After the calculation described above, for each webpage sample, the label values for each word segments included in the page title of the webpage sample can be obtained. The data correlation of the label values of a webpage sample can be represented by $\{(doc_j, ((term_{j1}, 1_{j1}), (term_{j2}, 1_{j2}), \ldots, (term_{jk}, 1_{jk})))\}$, where $doc_j$ represents a page sample, $\{term_{j1}, term_{j2}, \ldots, term_{jk}\}$ are word segments included in the webpage sample, and $\{1_{j1}, 1_{j2}, \ldots, 1_{jk}\}$ are label values of each word segment respectively.

At step S203, for each page title, a word feature value for each word segment included in the page title can be determined. The word feature value can indicate a degree of importance of the word segment in the corresponding webpage sample.

Determining the feature values of the word segments in the page titles can be referred to the step S102 of the disclosed method for extracting topic sentences from webpages described above in connection with FIG. 1.

At step S204, using a preset machine training algorithm, the label values and the word feature values of the word segments in each page title can be trained to obtain a machine learning model.

The machine training algorithm can include unknown quantities. The initial values of the unknown quantities can be preset. After inputting the word feature values of the word segments into the machine training algorithm, predicted label values of the word segments can be obtained. The predicted label values can be compared with the actual label values calculated in step S202, and the unknown quantities can be continuously revised based on the comparing results to obtain the final values of the unknown quantities. The final values of unknown quantities can be substituted into the machine training algorithm to obtain the machine learning model.

In some embodiments, the machine training algorithm can be a GBRank training algorithm. A partial order comparison method in the GBRank training algorithm can be a pairwise partial order comparison. A loss function in the GBRank training algorithm can be a cross entropy.

It should be noted that, the GBRank training process includes a partial order comparison process. The partial order comparison process can be a pairwise partial order comparison. That is, word feature values of two word segments can be used as the input, the predicted label values of the two word segments can be obtained and compared with the calculated actual label values of the two word segments.

A partial order comparison formula can be $$P_{ij} \equiv P(U_i \triangleright U_j) \equiv \frac{1}{1+e^{-\sigma(s_i-s_j)}}.$$

After a conversion, the formula can be finally written as $$\frac{\partial C}{\partial s_i} = \sigma\left(\frac{1}{2}(1-S_{ij}) - \frac{1}{1+e^{\sigma(s_i-s_j)}}\right) = -\frac{\partial C}{\partial s_j}.$$

Where $P_{ij}$ indicates a probability that one word segment is better than the other word segment. e is preset fixed value. $\sigma$ is a preset fixed value, usually set as 0.1, and can also be set as other values. A larger $\sigma$ indicates a larger error. $S_i$ is the predicted label value of the word segment $term_i$, and $S_j$ is the predicted label value of the word segment $term_j$.

A formula of the loss function can be $$C = -\overline{P}_{ij} \log P_{ij} - (1-P_{ij}).$$

If $\overline{P}_{ij} = \frac{1}{2}(1+S_{ij})$ is satisfied, then the following derivations can be made:

$$C = -\overline{P}_{ij} \log(1/(1+e^{-\sigma(s_i-s_j)})) - (1-\overline{P}_{ij}) \log(e^{-\sigma(s_i-s_j)}/(1-e^{-\sigma(s_i-s_j)}))$$

$$C = \overline{P}_{ij} \log(1/(1+e^{\sigma(s_i-s_j)})) - \log(e^{\sigma(s_i-s_j)}/(1+e^{\sigma(s_i-s_j)})) + \overline{P}_{ij} \log(e^{-\sigma(s_i-s_j)}/(1+e^{-\sigma(s_i-s_j)}))$$

$$C = \log((1/(1+e^{-\sigma(s_i-s_j)}))^{-\overline{P}_{ij}} * (e^{-\sigma(s_i-s_j)}/(1+e^{-\sigma(s_i-s_j)}))^{\overline{P}_{ij}}/(e^{-\sigma(s_i-s_j)})))$$

$$C = \log((e^{-\sigma(s_i-s_j)})^{\overline{P}_{ij}-1} * (1+e^{-\sigma(s_i-s_j)}))$$

$$C = \frac{1}{2}(1-S_{ij})\log(e)\sigma(s_i-s_j) + \log(1+e^{-\sigma(s_i-s_j)})$$

Since $\sigma$ and $\log_e$ are both constant numbers, the loss function can be converted as the following formula: $C = \frac{1}{2}(1-S_{ij})\sigma(s_i-s_j) + \log(1+e^{-\sigma(s_i-s_j)})$ where $S_{ij}$ is calculated by the relationship between the label values of the two word segments. If the label value of the word segment $term_i$ is larger than the label value of the word segment $term_j$, $S_{ij}$ can be assigned as a value of 1. If the label value of the word segment $term_i$ is less than the label value of the word segment $term_j$, $S_{ij}$ can be assigned as a value of -1. If the label value of the word segment $term_i$ is equal to the label value of the word segment $term_j$, $S_{ij}$ can be assigned as a value of 0. Noted that, other parameters in the formula can be referred to above descriptions.

After the above described machine training process, the final machine learning model can have a tree structure constructed by a set of judging conditions. For example, a specific structure can be a decision tree.

Turning back to FIG. 1, a specific implantation of the step 103 for determining a partial order value of each candidate topic sentence can include the following steps:

According to the partial order values of the word segments included in one candidate topic sentence, a weighted summation of the multiple importance values of the word segments can be calculated as the partial order value of the candidate topic sentence.

Specifically, each candidate topic sentence can include multiple word segments. Each word segment is associated with an importance value, and a weighted value. The weighted value of each word segment can be multiplied by the corresponding importance value. A summation of the multiplication results of the multiple word segments of the candidate topic sentence can be used as the partial order value of the candidate topic sentence.

In some implementations, the obtained target topic sentences of the webpages can be stored in a database, so that the webpages can be ranked when a webpage search is performed.

Specific storage steps can include establishing corresponding relationship between the candidate webpages and the target topic sentences, and storing the established corresponding relationship in a preset database.

Specifically, multiple candidate webpages can be determined, and each candidate webpage can have one or more target topic sentences. For each of the candidate webpage, the corresponding relationship between the candidate webpage and the one or more target topic sentences can be established.

It should be noted that, the candidate webpage can be represented by any suitable unique identification, such as the Uniform Resource Locator (URL) of the webpage. Therefore, the one or more target topic sentences of each candidate webpage can be stored in the database associated with the corresponding URL of the candidate webpage.

For example, a candidate webpage is "Sina Sports," the URL of the webpage is "url=sport.sina.com." Two obtained target topic sentences are namely "Sina sports storm" and "Sina sports." Therefore, the preset database can store the URL of "url=sport.sina.com," and the corresponding target topic sentences "Sina sports Storm" and "Sina sports."

The established database can be used for ranking the candidate webpage in response to a user search. Specifically, the ranking process can include steps A1 to A3 as follows.

At step A1, in response to a query term inputted by a user in a search engine, multiple retrieved webpages can be determined by the search engine. The retrieved webpages can be included in the candidate webpages.

When a user wants to search for certain aspects of information, a query term related to the information can be inputted into the search engine. The search engine can retrieve multiple relevant webpages. The retrieved relevant webpages may be referred to as retrieved webpages.

It should be noted that, there may be multiple candidate webpages, and there may be multiple the retrieved webpages. The retrieved webpages are included in the candidate webpages. Using the above-described method for extracting topic sentences from webpages, the target topic sentences of the candidate webpages can be obtained and stored in the preset database. Therefore, the target topic sentences of the retrieved webpages are also stored in the preset database At step A2, one or more target topic sentences of each retrieved webpage can be obtained from the preset database, and the query term can be matched with the determined target topic sentences of each retrieved webpage to get matching values.

In the preset database, the target topic sentences for each retrieved webpage can be searched. The retrieved webpage can be stored in the preset database by using the URL form. Therefore, the URL of the retrieved webpage can be searched, and then one or more target topic sentences corresponding to the URL can be obtained.

The query term entered by the user can be matched with the target topic sentences of the retrieved webpages respectively to obtain the matching values. It should be noted that, if the retrieved webpage has multiple target topic sentences, the query term can be matched with each target topic sentence to obtain matching value for each target topic sentence respectively. The maximum matching value can be used as the matching value of the query term with the retrieved webpage.

For example, a query term inputted in a search engine by a user is "Sina Sports." One webpage retrieved by the search engine has a URL "url=sport.sina.com." Two corresponding target topic sentences can be found in the preset database, namely, "Sina sports storm" and "Sina sports."

The query term "Sina sports" can be matched with the two target topic sentences "Sina sports storm" and "Sina sports." The two matching results are 0.8 and 1. The maximum value of 1 is the matching value of the query term "Sina sports" and the retrieved webpage "url=sport.sina.com."

If multiple webpages are retrieved, a matching value can be calculated between each retrieved webpage and the query term by using the above described method.

At step A3, according to the matching values, the retrieved webpages can be ranked and displayed in the search engine.

A higher matching value between the retrieved webpage and the query term indicates a higher correlation degree between the retrieved webpage and the query term. Using the matching values, the retrieved webpages can be ranked and listed in the search engine based on the ranking order. As such, the retrieved webpages having a high correlation degree with the query term can be arranged at the front of the list, which may facilitate the user to find more relevant webpages.

Figure 3:
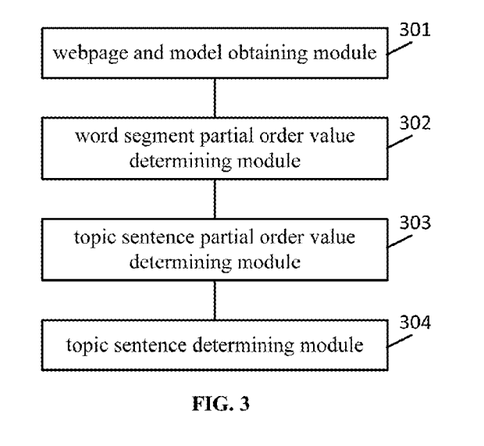
FIG. 3 illustrates a schematic structural diagram of an exemplary apparatus for extracting topic sentences from webpages in accordance with some embodiments of the present disclosure.

Referring to FIG. 3, a schematic structural diagram of an exemplary apparatus for extracting topic sentences from webpages is shown in accordance with some embodiments of the present disclosure. In some embodiments, the apparatus for extracting topic sentences from webpages can include a webpage and model obtaining module 301, a word segment importance value determining module 302, a topic sentence partial order value determining module 303, and a topic sentence determining module 304.

The webpage and model obtaining module 301 can be used for obtaining at least one candidate webpage, and pre-building a machine learning model. The at least one candidate webpage can contain multiple preselected candidate topic sentences, and each candidate topic sentence can include multiple word segments.

The word segment importance value determining module 302 can be used for imputing word feature values of the multiple word segments to the machine learning model to obtain importance values of the word segments. The word feature value can indicate a degree of importance of the word segment in the candidate webpage.

The topic sentence partial order value determining module 303 can be used for determining a partial order value of each candidate topic sentence according to the importance values of the word segments included in each candidate topic sentence.

The topic sentence determining module 304 can be used for determining a candidate topic sentence associated with a partial order value that is larger than a preset threshold value as a target topic sentence of the webpage.

Accordingly, in the disclosed apparatus for extracting topic sentences from webpages, at least one candidate webpage can firstly be obtained by the webpage and model obtaining module 301, each candidate webpage can contain multiple candidate topic sentences, and each candidate topic sentence can include multiple word segments. Then, a word feature value can be determined for each word segment. The word segment importance value determining module 302 can input multiple word feature values corresponding to the multiple word segments to a preset machine learning model to obtain the importance values of the word segments. Next, a partial order value of each candidate topic sentence can be determined by the topic sentence partial order value determining module 303 according to the importance values of the word segments included in each candidate topic sentence. Finally, a candidate topic sentence associated with a partial order value that is larger than a preset threshold value can be determined by the topic sentence determining module 304 as a target topic sentence of the webpage.

It should be noted that, the disclosed apparatus can use a machine learning model to obtain partial order values of candidate topic sentences. Since the webpage samples used in the training process of the machine learning model can reflect the degrees of correlation with the query term, the obtained machine learning model can be more accurate. Thus, the accuracy of the target topic sentence selection can be improved.

Figure 4:
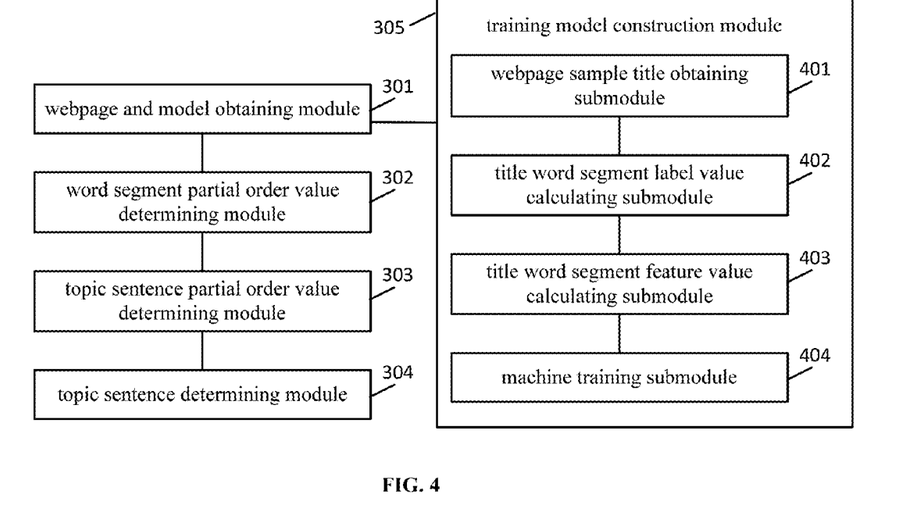
FIG. 4 illustrates a schematic structural diagram of another exemplary apparatus for extracting topic sentences from webpages in accordance with some embodiments of the present disclosure.

Referring to FIG. 4, a schematic structural diagram of another exemplary apparatus for extracting topic sentences from webpages is shown in accordance with some embodiments of the present disclosure. As illustrated, the apparatus for extracting topic sentences from webpages can further include a training model construction module 305 for pre-building a machine learning model.

The training model construction module 305 can include a webpage sample title obtaining sub-module 401, a title word segment label value calculating sub-module 402, a title word segment feature value calculating sub-module 403, and a machine training sub-module 404.

The webpage sample title obtaining sub-module 401 can be used for obtaining page titles of multiple webpage samples. Each webpage sample can correspond to one or more query terms for retrieving the webpage sample. Each query term can be associated with a weighted value. The weighted value can be used to indicate a correlation degree between the query term and the retrieved webpage sample.

The title word segment label value calculating sub-module 402 can be used for calculating a label value for each word segment included in each page title by using the formula of $$\text{label}(term_j) = \sum_{m=0}^{k} \left( v_m * w_m(term_j) \Big/ \left( \sum_{n=0}^{s} w_m(term_n) \right) \right),$$

where $term_j$ indicates a j-th word segment included in the page title, $label(term_j)$ is a label value of the word segment $term_j$, m is a query term, k is a total number of query terms, $v_m$ is a weighted value of the query term m, $w_m(term_j)$ is a weighted value of the word segment $term_j$ for the query term m, n is a word segment in the page title, and s is a total number of word segments in the page title.

The title word segment feature value calculating sub-module 403 can be used for determining a word feature value for each word segment included in each page title. The word feature value can indicate a degree of importance of the word segment in the corresponding webpage sample.

The machine training sub-module 404 can be used for using a preset machine training algorithm to train the label values and the word feature values of the word segments in each page title to obtain a machine learning model.

In some embodiments, the machine training algorithm can be a GBRank training algorithm. A partial order comparison method in the GBRank training algorithm can be a pairwise partial order comparison. A loss function in the GBRank training algorithm can be a cross entropy.

Turning back to FIG. 3, the topic sentence partial order value determining module 303 can include a weighted summation partial order value determining sub-module. The weighted summation partial order value determining sub-module can be used for calculating a weighted summation of the multiple importance values of the word segments included in each candidate topic sentence according to the importance values of the word segments. The calculated weighted summation of each candidate topic sentence can be used as the partial order value of the candidate topic sentence.

In some implementations, the above described apparatus for extracting topic sentences from webpages can further include a topic sentence storing module. The topic sentence storing module can be used for establishing corresponding relationship between target topic sentences and the candidate webpages, and sorting the corresponding relationship between target topic sentences and the candidate webpages in the preset database.

Further, the apparatus for extracting topic sentences from webpages can include a retrieved webpage determining module, a webpage topic sentence matching module, and a retrieved webpage ranking module.

The retrieved webpage determining module can be used for determining multiple retrieved webpages in response to a query term inputted by a user in a search engine. The retrieved webpages can be included in the candidate webpages.

The webpage topic sentence matching module can be used for matching one or more target topic sentences of each retrieved webpage obtained from the preset database with the query term to get the matching values.

The retrieved webpage ranking module can be used for ranking the retrieved webpages according to the matching values and displaying the retrieved webpages in the search engine based on the rank.

Figure 6:
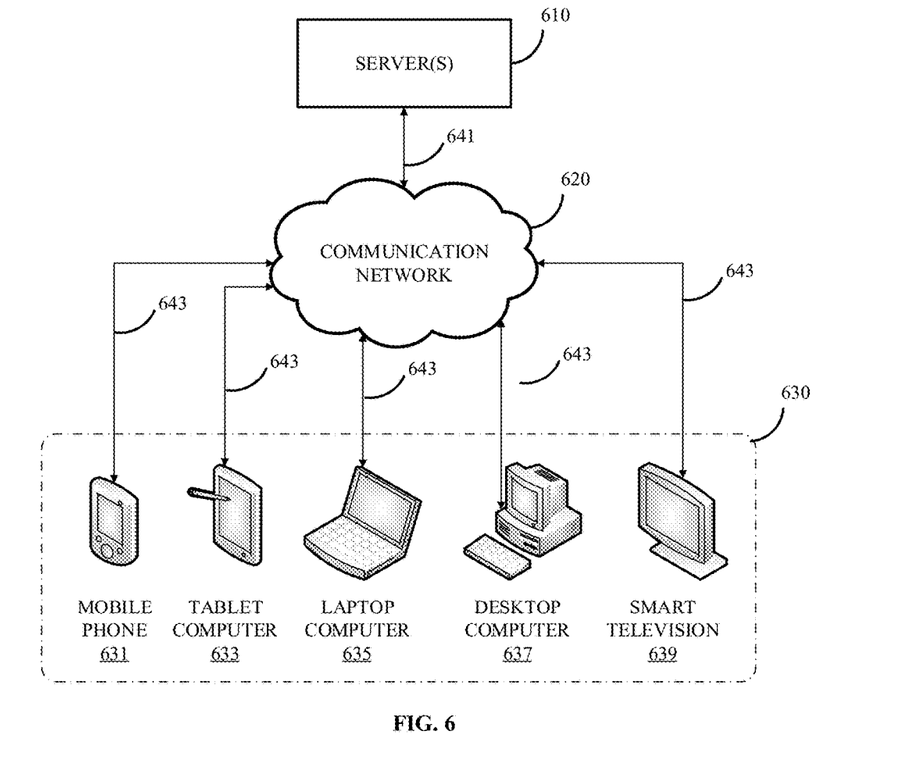
FIG. 6 illustrates a schematic structural diagram of an exemplary system incorporating certain aspects of the disclosed embodiments.

Referring to FIG. 6, an exemplary system for extracting topic sentences of webpages in accordance with some embodiments of the present disclosure is shown. As illustrated, the system can include one or more servers 610, a communication network 620, one or more user devices 630, and/or any other suitable component. User devices 630 can be connected by one or more communication links 643 to communications network 620 that can be linked via a communication link 641 to a server 610.

In some embodiments, one or more steps of, or all of, the method for extracting topic sentences of webpages described above in connection with FIGS. 1-2, can be implemented by one or more suitable hardware processors of server(s) 610, user device(s) 630, and/or other suitable component of the system.

Server(s) 610 and/or user device(s) 630 can include any suitable units described above in connection with FIGS. 3 and 4.

In some embodiments, communication network 620 can be any suitable combination of one or more wired and/or wireless networks such as the Internet, an intranet, a wide-area network ("WAN"), a local-area network ("LAN"), a wireless network, a digital subscriber line ("DSL") network, a frame relay network, an asynchronous transfer mode ("ATM") network, a virtual private network ("VPN"), a WiFi network, a WiMax network, a satellite network, a mobile phone network, a mobile data network, a cable network, a telephone network, a fiber optic network, and/or any other suitable communication network, or any combination of any of such networks.

User device(s) 630 can include any suitable device that can communicate with one or more severs though communication network 620, receive user request, process and transmit data, and/or present webpages, and/or perform any other suitable function. For example, a user device 630 can be a mobile phone 631, a tablet computer 633, a laptop computer 635, a desktop computer 637, a set-top box, a television 639, a streaming media player, a game console, and/or any other suitable device.

Although five type user devices 631, 633, 635, 637, and 639 are shown in FIG. 6 to avoid over-complicating the drawing, any suitable number of these terminals, and any suitable types of these terminals, can be used in some embodiments.

The disclosed apparatus for checking and updating data on a user device can be one or more user device(s) 630, and can be implemented using any suitable hardware in some embodiments. For example, as illustrated in an exemplary hardware 600 of FIG. 5, such hardware can include a hardware processor 504, memory and/or storage 501, bus 502, and communication interface(s) 503.

Figure 5:
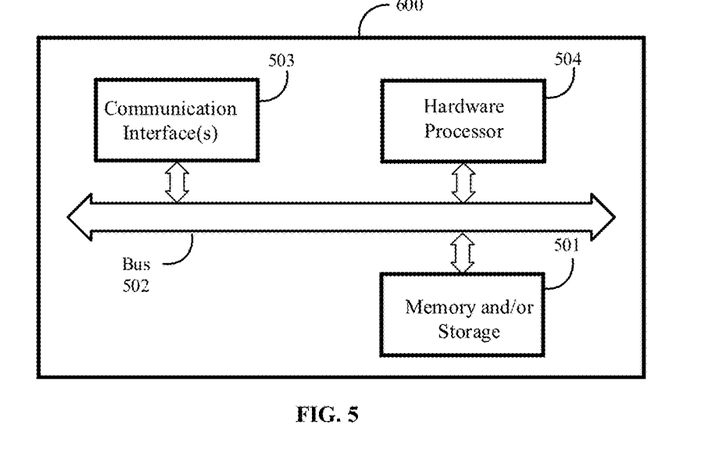
FIG. 5 illustrates a schematic hardware diagram of an exemplary apparatus for extracting topic sentences from webpages in accordance with some other embodiments of the present disclosure.

Memory and/or storage 501 can be any suitable memory and/or storage for storing programs, data, media content, webpage URLs, raw data of webpage resources, information of users and/or any other suitable content in some embodiments. For example, memory and/or storage 501 can include random access memory (RAM), read only memory, flash memory, such as hard disk storage, optical media, and/or any other suitable storage device.

Communication interface(s) 503 can be any suitable circuitry for interfacing with one or more communication networks, such as communication network 620 in some embodiments. For example, interface(s) 514 can include network interface card circuitry, wireless communication circuitry, and/or any other suitable circuitry for interfacing with one or more communication networks, such as Internet, wide area network, local network, metropolitan area networks, etc.

Bus 502 can be any suitable mechanism for communicating between two or more of components of the webpage resource acquisition apparatus. Bus 502 may be an ISA bus, a PCI bus, an EISA bus, or any other suitable bus. The bus 502 can be divided into an address bus, a data bus, a control bus, etc. The bus 502 is represented as a two-way arrow in FIG. 5, but it does not mean that it is only one type bus or only one bus.

Memory and/or storage 501 can be used for storing program. The hardware processor 504 can operate the program in response to receiving an operating instruction. In some embodiments, one or more steps of, or all of, the method for checking and updating data on a user device described above in connection with FIGS. 1-2, can be implemented by hardware processors 504.

Hardware processor 504 can include any suitable hardware processor, such as a microprocessor, a micro-controller, a central processing unit (CPU), a network processor (NP), a digital signal processor (DSP), an application specific integrated circuit (ASIC), a field-programmable gate array (FPGA), or other programmable logic device, discrete gate or transistor logic device, discrete hardware components. The hardware processor 504 can implement or execute various embodiments of the present disclosure including one or more method, steps and logic diagrams. A general purpose processor may be a microprocessor or any other conventional processors.

The steps of the disclosed method in various embodiments can be directly executed by a hardware decoding processor, or by a decoding processor combined by a hardware module and a software module. The software module may reside in any suitable storage/memory medium, such as a random access memory, a flash memory, a read-only memory, a programmable read-only memory, an electrically erasable programmable memory, a register, etc. The storage medium can be located in the memory and/or storage 501. Hardware processor 504 can implement the steps of the disclosed method by combining the hardware and the information read from the memory and/or storage 501.

In addition, the flowcharts and block diagrams in the figures illustrate various embodiments of the disclosed method and system, as well as architectures, functions and operations that can be implemented by a computer program product. In this case, each block of the flowcharts or block diagrams may represent a module, a code segment, a portion of program code. Each module, each code segment, and each portion of program code can include one or more executable instructions for implementing predetermined logical functions.

It should also be noted that, in some alternative implementations, the functions illustrated in the blocks be executed or performed in any order or sequence not limited to the order and sequence shown and described in the figures. For example, two consecutive blocks may actually be executed substantially simultaneously where appropriate or in parallel to reduce latency and processing times, or even be executed in a reverse order depending on the functionality involved in.

It should also be noted that, each block in the block diagrams and/or flowcharts, as well as the combinations of the blocks in the block diagrams and/or flowcharts, can be realized by a dedicated hardware-based system for executing specific functions, or can be realized by a dedicated system combined by hardware and computer instructions.

The present disclosure provides a computer program product for performing a method for extracting topic sentences of webpages. The computer program product includes computer-readable storage medium storing program codes. The program code includes instructions for performing the disclosed method. The specific implementations of the disclosed method can be referred to the various embodiments described above in connection with FIGS. 1 and 2.

Accordingly, in the disclosed method and apparatus for extracting topic sentences from webpages, at least one candidate webpage can firstly be obtained, each candidate webpage can contain multiple candidate topic sentences, and each candidate topic sentence can include multiple word segments. Then, a word feature value can be determined for each word segment. Multiple word feature values corresponding to the multiple word segments can be input to a preset machine learning model to obtain the importance values of the word segments. Next, a partial order value of each candidate topic sentence can be determined according to the importance values of the word segments included in each candidate topic sentence. Finally, a candidate topic sentence associated with a partial order value that is larger than a preset threshold value can be determined as a target topic sentence of the webpage.

The disclosed method and apparatus can use a machine learning model to obtain partial order values of candidate topic sentences. Since the webpage samples used in the training process of the machine learning model can reflect the degrees of correlation with the query term, the obtained machine learning model can be more accurate. Thus, the accuracy of the target topic sentence selection can be improved.

It should be noted that, as used herein, relational terms such as "first," "second," and the like are used solely to a separate one operation/entity and another operation/entity, and do not necessarily require or imply that these entities or operations have actual relationship or order. Moreover, the term "comprising," "including," or any other variation thereof are intended to cover a non-exclusive inclusion, such that a process, a method, an article, or an apparatus, including a series of elements, does not only include those elements, but also include other non-explicitly listed elements, or further include some inherent elements of such process, method, article or apparatus. Without further constraints, an element defined by the clause "include a . . . " does not exclude another same element in such process, method, article or apparatus.

Although the present disclosure has been described and illustrated in the foregoing illustrative embodiments, it is understood that the present disclosure has been made only by way of example, and that numerous changes in the details of embodiment of the present disclosure can be made without departing from the spirit and scope of the present disclosure, which is only limited by the claims which follow. Features of the disclosed embodiments can be combined and rearranged in various ways. Without departing from the spirit and scope of the present disclosure, modifications, equivalents, or improvements to the present disclosure are understandable to those skilled in the art and are intended to be encompassed within the scope of the present disclosure. It should be noted that, similar reference numerals and letters are used to refer to similar items in the figures, and thus once an item is defined in one figure, the item may not be further defined or explained in other figures.

What is claimed is:

1. A method for extracting topic sentences of webpages, comprising:

obtaining candidate webpages, and a pre-built machine learning model, wherein each candidate webpage contains a plurality of preselected candidate topic sentences, and each candidate topic sentence includes several word segments;

determining word feature values that indicate importance levels of the word segments in each candidate webpage respectively, and inputting the word feature values to the machine learning model to obtain an importance value for each word segment;

for each candidate webpage, determining a partial order value for each candidate topic sentence according to the importance values of the word segments included in the candidate topic sentence; and for each candidate webpage, selecting one of the plurality of candidate topic sentences that is associated with a partial order value larger than a preset threshold value as a target topic sentence of the candidate webpage, wherein:

the pre-built machine learning model is obtained by:

obtaining page titles of a plurality of webpage samples, wherein each webpage sample corresponds to one or more query terms for retrieving the webpage sample, each query term is associated with a weighted value for indicating a correlation degree between the query term and the retrieved webpage sample;

calculating a label value for each word segment included in each page title;

determining a word feature value for each word segment included in each page title, wherein the word feature value indicates an importance degree of the word segment in the corresponding webpage sample; and using a preset machine training algorithm to train the label values and the word feature values of the word segments in each page title to obtain the machine learning model.

2. The method of claim 1, wherein:

the label value for each word segment included in each page title is calculated by using a formula of $$\text{label}(term_j) = \sum_{m=0}^{k} \left( v_m * w_m(term_j) \Big/ \left( \sum_{n=0}^{s} w_m(term_n) \right) \right),$$

wherein $term_j$ indicates a j-th word segment included in the page title, $\text{label}(term_j)$ is a label value of the word segment $term_j$, m is a query term, k is a total number of query terms, $v_m$ is a weighted value of the query term m, $w_m(term_j)$ is a weighted value of the word segment term for the query term m, n is a word segment in the page title, and s is a total number of word segments in the page title.

3. The method of claim 1, wherein:

the preset machine training algorithm is a GBRank training algorithm;

a partial order comparison method in the GBRank training algorithm is a pairwise partial order comparison; and a loss function in the GBRank training algorithm is a cross entropy.

4. The method of claim 1, wherein determining a partial order value for each candidate topic sentence comprises:

for each candidate topic sentence, calculating a weighted summation of the plurality of importance values of the word segments included in the candidate topic sentence as the partial order value of the candidate topic sentence.

5. The method of claim 1, further comprising:

establishing a correspondence relationship between the plurality of target topic sentences and the plurality of candidate webpages; and storing the correspondence relationship in a preset database.

6. The method of claim 5, further comprising:

in response to a searching query of a search engine, determining a plurality of retrieved webpages by the search engine, wherein the plurality of retrieved webpages are included in the plurality of the candidate webpages;

retrieving the target topic sentence of each retrieved webpage from the preset database, and matching the target topic sentence with the searching query to obtain a matching value for each retrieved webpage; and ranking the plurality of retrieved webpages based on the corresponding matching values.

7. The method of claim 1, wherein determining the word feature value for each word segment comprises:

calculating a term frequency, an inverse document frequency, a continuous hit rate, and a proximity of each word segment.

8. The method of claim 1, wherein:

the partial order value for each candidate topic sentence is determined according to a multiplication product of the importance values of the word segments included in the candidate topic sentence and a penalty factor corresponding to a similarity degree between an external link of the candidate webpage and the candidate topic sentence.

9. An apparatus for extracting topic sentences of webpages, comprising one or more processors and memory, wherein the one or more processors are configured to:

obtain candidate webpage, and pre-build a machine learning model, wherein each candidate webpage contains a plurality of preselected candidate topic sentences, and each candidate topic sentence includes several word segments;

determine word feature values that indicates importance levels of the word segments in each candidate webpage, and input the word feature values to the machine learning model to obtain an importance value for each word segment;

determine, for each candidate webpage, a partial order value for each candidate topic sentence according to the importance values of the word segments of the candidate topic sentence; and select, for each candidate webpage, one of the plurality of candidate topic sentences that is associated with a partial order value larger than a preset threshold value as a target topic sentence of the candidate webpage, wherein:

the pre-built machine learning model is obtained by the one or more processors configured to:

obtain page titles of a plurality of webpage samples, wherein each webpage sample corresponds to one or more query terms for retrieving the webpage sample, each query term is associated with a weighted value for indicating a correlation degree between the query term and the retrieved webpage sample;

calculate a label value for each word segment included in each page title;

determine a word feature value for each word segment included in each page title, wherein the word feature value indicates an importance degree of the word segment in the corresponding webpage sample; and use a preset machine training algorithm to train the label values and the word feature values of the word segments in each page title to obtain the machine learning model.

10. The apparatus of claim 9, wherein:

the label value for each word segment included in each page title is calculated by using a formula of $$\text{label}(term_j) = \sum_{m=0}^{k}\left(v_m * w_m(term_j) \bigg/ \left(\sum_{n=0}^{s} w_m(term_n)\right)\right),$$

wherein term indicates a j-th word segment included in the page title, label(term$_j$) is a label value of the word segment term$_j$, m is a query term, k is a total number of query terms, $v_m$ is a weighted value of the query term m, $w_m$, (term$_j$) is a weighted value of the word segment term$_j$ for the query term m, n is a word segment in the page title, and s is a total number of word segments in the page title.

11. The apparatus of claim 9, wherein:
the preset machine training algorithm is a GBRank training algorithm;
a partial order comparison method in the GBRank training algorithm is a pairwise partial order comparison; and
a loss function in the GBRank training algorithm is a cross entropy.

12. The apparatus of claim 9, wherein the the one or more processors are further configured to:
calculate, for each candidate topic sentence, a weighted summation of the plurality of importance values of the word segments included in the candidate topic sentence as the partial order value of the candidate topic sentence.

13. The apparatus of claim 9, wherein the one or more processors are further configured to:
establish a correspondence relationship between the plurality of target topic sentences and the plurality of candidate webpages; and
store the correspondence relationship in a preset database.

14. The apparatus of claim 13, wherein the one or more processors are further configured to:
determine, in response to a searching query of a search engine, a plurality of retrieved webpages by the search engine, wherein the plurality of retrieved webpages are included in the plurality of the candidate webpages;
retrieve the target topic sentence of each retrieved webpage from the preset database, and matching the target topic sentence with the searching query to obtain a matching value for each retrieved webpage; and
rank the plurality of retrieved webpages based on the corresponding matching values.

15. The apparatus of claim 9, wherein the one or more processors are further configured to:
calculate a term frequency, an inverse document frequency, a continuous hit rate, and a proximity of each word segment.

16. The apparatus of claim 9, wherein:
the partial order value for each candidate topic sentence is determined according to a multiplication product of the importance values of the word segments included in the candidate topic sentence and a penalty factor corresponding to a similarity degree between an external link of the candidate webpage and the candidate topic sentence.

17. A non-transitory computer readable memory comprising a computer readable program stored thereon, wherein, when being executed, the computer readable program causes a computer to implement a method for extracting topic sentences of webpages, the method comprising:
obtaining candidate webpage, and a pre-built machine learning model, wherein each candidate webpage contains a plurality of preselected candidate topic sentences, and each candidate topic sentence includes several word segments;
determining word feature values that indicate importance levels of the word segments in each candidate webpage, wherein the word feature value includes a term frequency, an inverse document frequency, a continuous hit rate, and a proximity of the word segment;
inputting the word feature values to the machine learning model to obtain an importance value for each word segment;
for each candidate webpage, determining a partial order value for each candidate topic sentence according to the importance values of the word segments included in the candidate topic sentence; and
for each candidate webpage, selecting one of the plurality of candidate topic sentences that is associated with a partial order value larger than a preset threshold value as a target topic sentence of the candidate webpage, wherein:
the pre-built machine learning model is obtained by:
obtaining page titles of a plurality of webpage samples, wherein each webpage sample corresponds to one or more query terms for retrieving the webpage sample, each query term is associated with a weighted value for indicating a correlation degree between the query term and the retrieved webpage sample;
calculating a label value for each word segment included in each page title;
determining a word feature value for each word segment included in each page title, wherein the word feature value indicates an importance degree of the word segment in the corresponding webpage sample; and
using a preset machine training algorithm to train the label values and the word feature values of the word segments in each page title to obtain the machine learning model.

18. The non-transitory computer readable memory of claim 17, further comprises a process for pre-building the machine learning model, including:
calculating the label value for each word segment included in each page title by using a formula of $$\text{label}(term_j) = \sum_{m=0}^{k}\left(v_m * w_m(term_j) \bigg/ \left(\sum_{n=0}^{s} w_m(term_n)\right)\right),$$

wherein term$_j$ indicates a j-th word segment included in the page title, label(term$_j$) is a label value of the word segment term$_j$ m is a query term, k is a total number of query terms, $v_m$ is a weighted value of the query term m, $w_m$, (term$_j$) is a weighted value of the word segment term$_j$ for the query term m, n is a word segment in the page title, and s is a total number of word segments in the page title.

19. The non-transitory computer readable memory of claim 18, wherein:
the preset machine training algorithm is a GBRank training algorithm;
a partial order comparison method in the GBRank training algorithm is a pairwise partial order comparison;
a loss function in the GBRank training algorithm is a cross entropy;

for each candidate topic sentence of each candidate topic sentence, calculating a weighted summation of the plurality of importance values of the word segments included in the candidate topic sentence as the partial order value of the candidate topic sentence.

20. The non-transitory computer readable memory of claim 17, wherein the method further comprises:
- establishing a correspondence relationship between the plurality of target topic sentences and the plurality of candidate webpages; and
- storing the correspondence relationship in a preset database;
- in response to a searching query of a search engine, determining a plurality of retrieved webpages by the search engine, wherein the plurality of retrieved webpages are included in the plurality of the candidate webpages;
- retrieving the target topic sentence of each retrieved webpage from the preset database, and matching the target topic sentence with the searching query to obtain a matching value for each retrieved webpage; and
- ranking the plurality of retrieved webpages based on the corresponding matching values.

* * * * *